United States Patent
Igarashi et al.

(10) Patent No.: US 9,669,826 B2
(45) Date of Patent: Jun. 6, 2017

(54) DRIVING-ASSISTANCE DEVICE AND DRIVING-ASSISTANCE METHOD

(71) Applicant: TOYOTA JIDOSHA KABUSHIKI KAISHA, Toyota-shi, Aichi (JP)

(72) Inventors: Shinji Igarashi, Susono (JP); Masayuki Katoh, Gotenba (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/437,208

(22) PCT Filed: Nov. 21, 2012

(86) PCT No.: PCT/JP2012/080213
§ 371 (c)(1),
(2) Date: Apr. 21, 2015

(87) PCT Pub. No.: WO2014/080483
PCT Pub. Date: May 30, 2014

(65) Prior Publication Data
US 2015/0283999 A1    Oct. 8, 2015

(51) Int. Cl.
*B60W 30/08*    (2012.01)
*G08G 1/16*    (2006.01)

(52) U.S. Cl.
CPC .............. *B60W 30/08* (2013.01); *G08G 1/165* (2013.01); *G08G 1/166* (2013.01); *B60W 2550/10* (2013.01)

(58) Field of Classification Search
CPC ........ B60W 30/08; G08G 1/165; G08G 1/166
See application file for complete search history.

(56) References Cited

U.S. PATENT DOCUMENTS

2014/0032093 A1* 1/2014 Mills .................. B60W 40/107
701/301
2014/0257593 A1  9/2014 Igarashi

FOREIGN PATENT DOCUMENTS

| JP | 7-149193 A | 6/1995 |
| WO | 2013046298 A1 | 4/2013 |

\* cited by examiner

*Primary Examiner* — Basil T Jos
(74) *Attorney, Agent, or Firm* — Sughrue Mion, PLLC (57) ABSTRACT

A driving-assistance device is disclosed. The driving-assistance device in which, when a three-dimensional object is present on a course of a host vehicle, driving assistance for avoiding a collision between the host vehicle and the three-dimensional object is implemented on a condition that an unavoidable three-dimensional object is present in a predetermined range including the course, the driving-assistance device comprises a setting unit configured to set the predetermined range in the vicinity of the host vehicle at a degree of width depending on the three-dimensional object, wherein, when a plurality of the three-dimensional objects are detected within the predetermined range, the setting unit makes the degree of width smaller than when a single three-dimensional object is detected within the predetermined range.

10 Claims, 10 Drawing Sheets

DRIVING-ASSISTANCE DEVICE AND DRIVING-ASSISTANCE METHOD

CROSS REFERENCE TO RELATED APPLICATIONS

This application is a National Stage of International Application No. PCT/JP2012/080213 filed Nov. 21, 2012, the contents of which are incorporated herein by reference in their entirety.

TECHNICAL FIELD

The present invention relates to a driving-assistance device and a driving-assistance method.

BACKGROUND ART

Patent Literature 1 discloses a vehicle collision prevention device that executes a collision prevention process when a relative distance between a host vehicle and an object in front is set to be equal to or less than a predetermined safety distance. This vehicle collision prevention device detects a tire abnormality of a host vehicle or the grade of a traveling road of a host vehicle, and determines a predetermined safety distance on the basis of the detection results.

CITATION LIST

Patent Literature

[Patent Literature 1] Japanese Unexamined Patent Application Publication No. 7-149193

SUMMARY OF INVENTION

Technical Problem

Incidentally, in the aforementioned technique, when driving assistance for collision avoidance is implemented in spite of a collision between a host vehicle and a three-dimensional object being able to be avoided by a normal driving operation of a driver, the driver may feel troubled. The inventor has obtained the following knowledge through assiduous research in view of such a situation.

That is, when driving assistance for avoiding a collision between the host vehicle and the three-dimensional object is implemented on a condition that a predetermined range including a course of the host vehicle is set, and that an unavoidable three-dimensional object is present within the predetermined range, it is possible to prevent a driver from feeling troubled through the implementation of driving assistance. According to such knowledge, it is possible to implement driving assistance for collision avoidance appropriate to a driver's intuition by preventing the driver from feeling troubled. In this manner, in a technique for driving assistance relating to collision avoidance, it is preferable to realize driving assistance more appropriate to a driver's intuition.

Consequently, an object of the present invention is to provide a driving-assistance device and a driving-assistance method which are capable of implementing driving assistance for collision avoidance more appropriate to a driver's intuition.

Solution to Problem

In order to solve the above-mentioned problem, the inventor has performed further research, and has attained the following new knowledge. The new knowledge means that, as described above, even when the presence of an unavoidable three-dimensional object within a predetermined range including a course of a host vehicle is set as a condition for implementing driving assistance for collision avoidance, the driving assistance for collision avoidance may be implemented at a timing slower than a driver's actual intuition in such a situation that a plurality of three-dimensional objects are present within the predetermined range. In such a case, there may be a concern of a sense of discomfort being caused to a driver. The present invention is contrived on the basis of such new knowledge.

That is, according to the present invention, there is provided a driving-assistance device in which, when a three-dimensional object is present on a course of a host vehicle, driving assistance for avoiding a collision between the host vehicle and the three-dimensional object is implemented on a condition that an unavoidable three-dimensional object is present in a predetermined range including the course, the driving-assistance device including setting means configured to set the predetermined range in the vicinity of the host vehicle at a degree of width depending on the three-dimensional object, wherein when a plurality of the three-dimensional objects are detected within the predetermined range, the setting means makes the degree of width smaller than when a single three-dimensional object is detected within the predetermined range.

In addition, according to the present invention, there is provided a driving-assistance method in which, when a three-dimensional object is present on a course of a host vehicle, driving assistance for avoiding a collision between the host vehicle and the three-dimensional object is implemented on a condition that an unavoidable three-dimensional object is present in a predetermined range including the course, the method including a setting step of setting the predetermined range at a degree of width depending on the three-dimensional object in the vicinity of the host vehicle, wherein in the setting step, when plurality of the three-dimensional objects are detected within the predetermined range, the degree of width is made smaller than when a single three-dimensional object is detected within the predetermined range.

In the driving-assistance device and the driving-assistance method, driving assistance for avoiding a collision between the host vehicle and the three-dimensional object is implemented on a condition that an unavoidable three-dimensional object is present in the predetermined range including a course of the host vehicle (that is, within the predetermined range which is set in the vicinity of the host vehicle, impossibility of a collision avoidance between the host vehicle and the three-dimensional object is set as a condition for implementing the driving assistance for collision avoidance). Therefore, it is possible to prevent a driver from feeling troubled, and to implement driving assistance for collision avoidance appropriate to a driver's intuition. Particularly, in the driving-assistance device and the driving-assistance method, the degree of width of the predetermined range becomes relatively smaller when a plurality of three-dimensional objects are detected within the predetermined range. For this reason, when the plurality of three-dimensional objects are present, a timing at which a collision between the host vehicle and the three-dimensional object cannot be avoided within the predetermined range (that is, a timing at which a condition for implementing the driving assistance for collision avoidance is established) becomes relatively earlier. Thus, according to the driving-assistance device and the driving-assistance method, even in a situation where a plurality of target objects are present within the predetermined range, it is possible to implement the driving assistance for collision avoidance more appropriate to a driver's intuition without causing a sense of discomfort to a driver.

In the driving-assistance device according to the present invention, when the plurality of three-dimensional objects are detected within the predetermined range, the setting means can set the degree of width of the predetermined range to the degree of width depending on the three-dimensional object in which the degree of width is set to be smallest among the plurality of three-dimensional objects. In this case, since the driving assistance for collision avoidance can be implemented at a timing depending on the three-dimensional object in which the degree of width is set to be smallest among the plurality of three-dimensional objects, it is possible to implement the driving assistance for collision avoidance still more appropriate to a driver's intuition.

Here, since the risks of a collision (the degrees of collision risk) with the three-dimensional object which are felt by a driver are different from each other depending on the state (such as, for example, moving state or type) of the three-dimensional object, it is considered that timings at which the driver attempts to avoid the collision are also different from each other. Particularly, the driver feels more risk in a case where the three-dimensional object is a moving object than in a case where the three-dimensional object is a stationary object, and thus it is considered that the driver will attempt to avoid the collision at an earlier timing.

Consequently, in the driving-assistance device according to the present invention, when the plurality of three-dimensional objects including a stationary object and a moving object are detected within the predetermined range, the setting means can set the degree of width of the predetermined range to the degree of width depending on the moving object in which the degree of width is set to be smallest among the plurality of three-dimensional objects. In this manner, when the degree of width of the predetermined range is set to the degree of width depending on the moving object, the timing at which the condition for implementing the driving assistance for collision avoidance is established corresponds to the moving object, and thus it is possible to implement the driving assistance for collision avoidance still more appropriate to a driver's intuition.

In the driving-assistance device according to the present invention, the setting means can make the degree of width smaller as a degree of risk of a collision between the host vehicle and the three-dimensional object becomes higher. In this case, since the driving assistance for collision avoidance can be implemented at a timing depending on the degree of risk of a collision between the host vehicle and the three-dimensional object, it is possible to implement the driving assistance for collision avoidance still more appropriate to a driver's intuition.

Here, it is considered that the driver feels more risk as the speed of approach between the host vehicle and the three-dimensional object becomes higher. Consequently, in the driving-assistance device according to the present invention, the setting means can make the degree of width smaller as a speed of approach between the host vehicle and the three-dimensional object becomes higher. In this manner, when the degree of width of the predetermined range is set to become smaller as the speed of approach between the host vehicle and the three-dimensional object becomes higher, the timing at which the condition for implementing the driving assistance for collision avoidance is established becomes earlier, and thus it is possible to implement driving assistance for collision avoidance still more appropriate to a driver's intuition.

In addition, it is considered that the driver feels more risk as the absolute movement velocity of the three-dimensional object becomes higher. Consequently, in the driving-assistance device according to the present invention, the setting means can make the degree of width smaller as an absolute movement velocity of the three-dimensional object becomes higher. In this manner, when the degree of width of the setting range is set to become smaller as the absolute movement velocity of a target object becomes higher, the timing at which the condition for implementing the driving assistance for collision avoidance is established becomes earlier, and thus it is possible to implement driving assistance for collision avoidance still more appropriate to a driver's intuition.

In the driving-assistance device according to the present invention, the setting means can set a travel range of the host vehicle which is specified by a plurality of travel routes along which the host vehicle is capable of traveling when the current momentum of the host vehicle is increased or decreased by the amount of variation in momentum, as the predetermined range, and can change the degree of width by changing the amount of variation in momentum. In this case, a change in the degree of width of the predetermined range depending on the three-dimensional object is facilitated. Meanwhile, examples of the "momentum" to be used herein can include, for example, a yaw rate acting on the host vehicle, acceleration (longitudinal acceleration) acting in the longitudinal direction of the host vehicle, acceleration (lateral acceleration) acting in the lateral direction (vehicle-width direction) of the host vehicle, G (longitudinal G) acting in the longitudinal direction of the host vehicle, G (lateral G) acting in the lateral direction of the host vehicle, a cornering force, and the like.

In this case, the driving-assistance device according to the present invention can further include determination means configured to determine that an unavoidable three-dimensional object is present in the travel range when an avoidance line which is a travel route of the host vehicle for which there is capability of avoiding a collision with the three-dimensional object is not present within the predetermined range. In this case, it can be reliably determined that the unavoidable three-dimensional object is present (that is, a collision between the host vehicle and the three-dimensional object cannot be avoided).

Here, some drivers tend to implement collision avoidance at a relatively late timing. As for such drivers, in a case where the driving assistance for collision avoidance is immediately implemented when it is determined that the unavoidable three-dimensional object is present in the travel range when an avoidance line is not present in the travel range, there may be a concern of causing these drivers to feel troublesome.

Consequently, the driving-assistance device according is the present invention can further include assistance means configured to implement the driving assistance when a length of a travel route having a longest distance among travel routes of the host vehicle included in the travel range is equal to or less than a predetermined threshold, in a case where the determination means determines that the unavoidable three-dimensional object is present in the travel range. In this manner, even in a case where it is determined that the unavoidable three-dimensional object is present in the travel range, the implementation of the driving assistance for collision avoidance when the length of a travel route having a longest distance among travel routes is set to be equal to or less than a predetermined threshold enables the driving assistance for collision avoidance to be implemented without causing such drivers to feel troublesome.

Advantageous Effects of Invention

According to the present invention, it is possible to provide a driving-assistance device and a driving-assistance method which are capable of implementing driving assistance for collision avoidance more appropriate to a driver's intuition.

DESCRIPTION OF EMBODIMENTS

Hereinafter, an embodiment of a driving-assistance device and a driving-assistance method according to the present invention will be described in detail with reference to the accompanying drawings. Meanwhile, in the description of the drawings, the same components or equivalent components are denoted by the same reference numerals and signs, and thus the description thereof will not be repeated.

Figure 1:
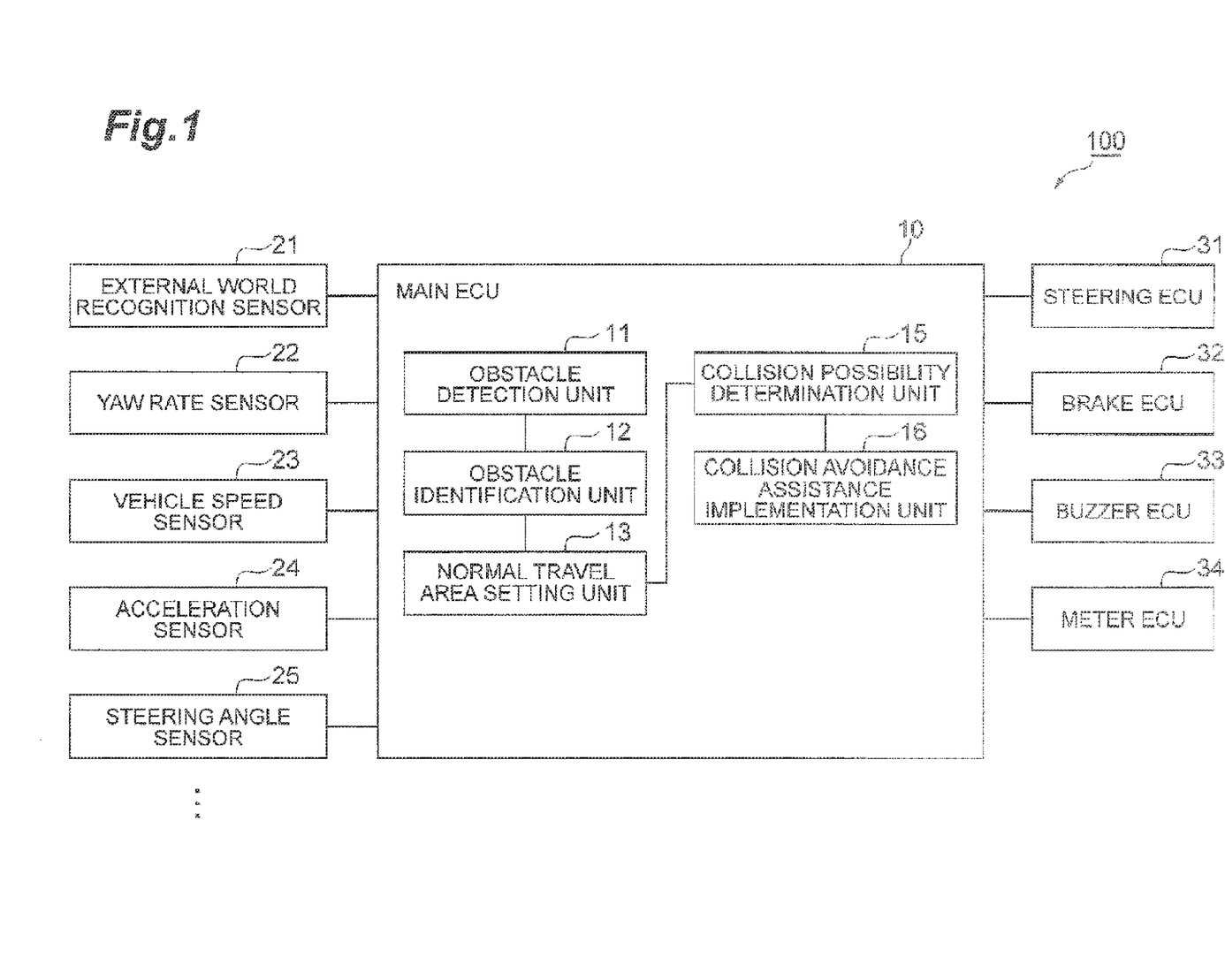
FIG. 1 is block diagram illustrating a configuration of a driving-assistance device according to an embodiment of the invention.

FIG. 1 is a block diagram illustrating a configuration of a driving-assistance device according to embodiment of the invention. As shown in FIG. 1, a driving-assistance device 100 according to the present embodiment includes a main ECU (Electrical Control Unit) 10, various types of sensors 21 to 25 which are connected to the main ECU 10, and various types of ECUs 31 to 34 which are connected to the main ECU 10.

Hereinafter, a vehicle in which such a driving-assistance device 100 is mounted is called a "host vehicle". In addition, a three-dimensional object which is a target in assistance for collision avoidance with the host vehicle is called an "obstacle". The driving-assistance device 100 sets impossibility of collision avoidance between the host vehicle and the obstacle (three-dimensional object) within a predetermined range set in the vicinity of the host vehicle, as a condition for implementing driving assistance for collision avoidance that a collision between the host vehicle and the obstacle (three-dimensional object) cannot be avoided within a predetermined range which is set in the vicinity of the host vehicle. That is, when a three-dimensional object is present on a course of the host vehicle, the driving-assistance device 100 implements driving assistance for avoiding a collision between the host vehicle and the obstacle, on a condition that an unavoidable obstacle is present in a predetermined range including the course.

Meanwhile, "a collision cannot be avoided (or, an unavoidable obstacle is present)" herein means that a collision between a host vehicle and an obstacle cannot be avoided within a range of a driving operation which is capable of being normally performed by a driver of the host vehicle (or, such an obstacle is present), and does not indicate that a collision cannot be avoided even when driving assistance for collision avoidance using the driving-assistance device 100 is performed.

The external world recognition sensor 21 acquires information on an obstacle which is present in the vicinity of a host vehicle, information indicating a relative relation between the obstacle and the host vehicle, or the like. The information which is acquired by the external world recognition sensor 21 is, for example, image information of the obstacle, information indicating the speed of approach (relative movement speed) between the host vehicle and the obstacle, information indicating a relative position (for example, relative distance or relative angle) between the host vehicle and the obstacle, information indicating the absolute movement velocity of the obstacle, or the like.

Such an external world recognition sensor 21 can be constituted by at least one of measurement devices such as, for example, LIDAR (Laser Imaging Detection and Ranging), a laser range finder, a millimeter-wave radar, and a stereo camera.

The yaw rate sensor 22 acquires information indicating a yaw rate acting on the host vehicle. The vehicle speed sensor 23 acquires information indicating the speed of the host vehicle. The acceleration sensor 24 acquires information indicating acceleration (longitudinal acceleration) acting in the longitudinal direction of the host vehicle or acceleration (lateral acceleration) acting in the lateral direction (vehicle-width direction) of the host vehicle. The steering angle sensor 25 acquires information indicating the steering angle of the host vehicle.

The external world recognition sensor 21, the yaw rate sensor 22, the vehicle speed sensor 23, the acceleration sensor 24, and the steering angle sensor 25 output the acquired information, respectively, to the main ECU 10. Meanwhile, the driving-assistance device 100 can include any other sensors (not shown), as necessary, in addition to the various types of sensors 21 to 25 described above.

Other sensors to be illustrated which can be included in the driving-assistance device 100 include a brake sensor that acquires information indicating an operating torque (pedal force) of the brake pedal of the host vehicle, an accelerator sensor that acquires information indicating an operating torque (pedal force) of the accelerator pedal of the host vehicle, a steering torque sensor that acquires information indicating a steering torque of the host vehicle, and the like.

The steering ECU 31 controls electric power steering, for example, in order to assist the host vehicle with its steering torque in accordance with an instruction from the main ECU 10. The brake ECU 32 electrically adjusts the operating hydraulic pressure (brake hydraulic pressure) of an electronically controlled brake which is provided to each wheel, for example, in order to brake the host vehicle in accordance with an instruction from the main ECU 10.

The buzzer ECU 33 controls a buzzer, for example, so as to sound the buzzer of the host vehicle in accordance with an instruction from the main ECU 10. The meter ECU 34 controls display of a display unit, for example, so as to perform a predetermined display on the display unit for a meter of the host vehicle in accordance with an instruction from the main ECU 10.

Here, the main ECU 10 includes an obstacle detection unit 11, an obstacle identification unit 12, a normal travel area setting unit (setting means) 13, a collision possibility determination unit (determination means) 15, and a collision avoidance assistance implementation unit (assistance means) 16. Meanwhile, the main ECU 10 is mainly constituted by a computer including a CPU, a ROM, a RAM, and the like. The operation of each unit of the main ECU 10 is realized by executing a predetermined program on such a computer.

The obstacle detection unit 11 detects obstacles which are targets in collision avoidance assistance of the host vehicle, on the basis of information or the like which is input from the external world recognition sensor 21. Meanwhile, the obstacles (that is, three-dimensional objects which are targets in collision avoidance in the driving-assistance device 100) which are detected by the obstacle detection unit 11 are, for example, stationary objects such as a telephone pole, a tree, a guardrail and the like, and moving objects such as a pedestrian, a two-wheeled vehicle such as a bicycle, a vehicle such as a preceding vehicle or an oncoming vehicle, and the like.

The obstacle identification unit 12 identifies the obstacle which is detected by the obstacle detection unit 11. Thereby, it is identified whether the obstacle which is detected by the obstacle detection unit 11 corresponds to, for example, any of the above ones. Meanwhile, the identification of the obstacle can be performed by, for example, any methods such as pattern matching based on image recognition or a combination method of white line information.

The normal travel area setting unit 13 sets a normal travel area (predetermined range) of a driver in the vicinity of the host vehicle. The setting of the normal travel area of the normal travel area setting unit 13 will be described in detail with reference to FIG. 2. The normal travel area setting unit 13 first acquires a current lateral acceleration (momentum) $Gy$ of a host vehicle C on the basis of information which is input from the acceleration sensor 24. Subsequently, the normal travel area setting unit 13 specifies a route (course) A through which the host vehicle C is expected to pass when the host vehicle travels with the current lateral acceleration $Gy$ being maintained.

Figure 2:
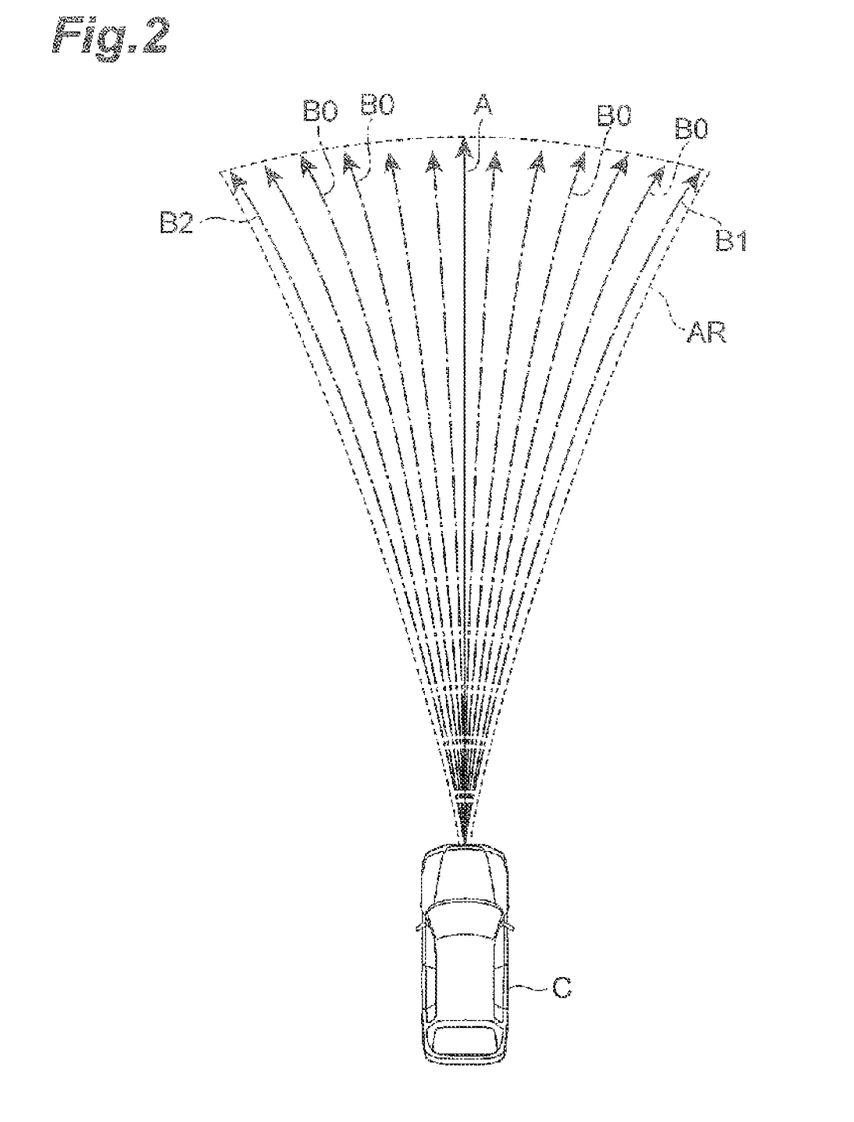
FIG. 2 is a diagram illustrating a situation in which a normal travel area setting unit shown in FIG. 1 sets a normal travel area.

Subsequently, when the normal amount of variation (amount of variation in momentum) $\Delta Gy$ is added to the current lateral acceleration $Gy$ of the host vehicle C, the normal travel area setting unit 13 specifies a route (course) B1 through which the host vehicle C is expected to pass. Concurrently with this, when the normal amount of variation $\Delta Gy$ is subtracted from the current lateral acceleration $Gy$ of the host vehicle C, the normal travel area setting unit 13 specifies a route (course) B2 through which the host vehicle C is expected to pass. Meanwhile, the normal amount of variation $\Delta Gy$ is, for example, an amount equivalent to the maximum amount of variation of lateral acceleration within a range of a driving operation which can be normally performed by a driver, and an amount which is experimentally obtained in advance.

The routes B1 and B2 can be specified from, for example, the turning radius $R$ of the host vehicle C which is calculated from a value obtained by subtracting or adding the normal amount of variation $\Delta Gy$ from or to the current lateral acceleration $Gy$. Meanwhile, the turning radius $R$ can be obtained by dividing a vehicle speed $V$ by a yaw rate $\gamma$ ($R = V/\gamma$). In addition, the yaw rate $\gamma$ can be obtained by dividing the lateral acceleration $Gy$ by the vehicle speed $V$ ($\gamma = Gy/V$).

Figure 3:
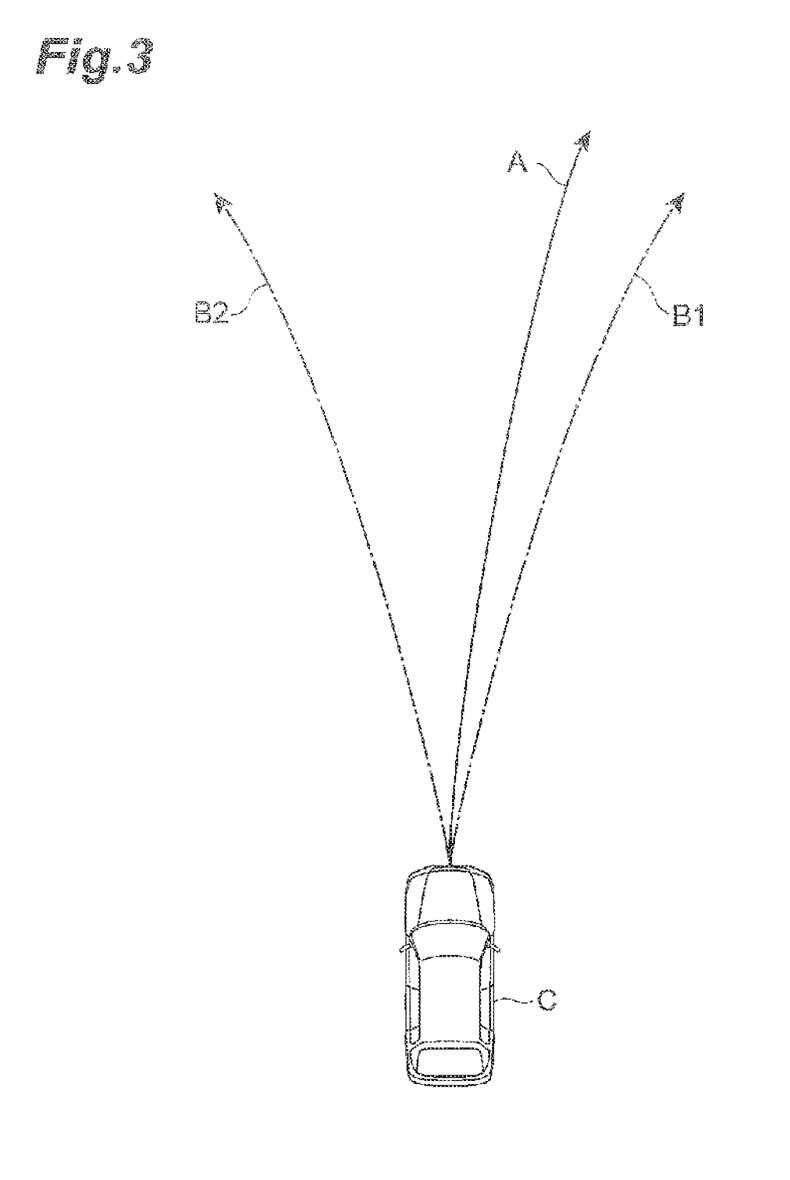
FIG. 3 is a diagram illustrating a modification example of an operation of the normal travel area setting unit shown in FIG. 1.

Meanwhile, as shown in FIG. 3, when the host vehicle C is already in a turning state at this moment in time ($|Gy| > 0$), there is a possibility that the absolute value ($|Gy \pm \Delta Gy|$) of a value obtained by increasing or decreasing the current lateral acceleration $Gy$ by the normal amount of variation $\Delta Gy$ may become larger than a maximum lateral acceleration (for example, 0.2 G to 0.3 G) which can be generated by a normal driving operation of a driver. Thus, the magnitude of the normal amount of variation $\Delta Gy$ may be restricted so that the absolute value of the value obtained by increasing or decreasing the current lateral acceleration $Gy$ by the normal amount of variation $\Delta Gy$ becomes equal to or less than the maximum lateral acceleration.

Subsequently, as shown in FIG. 2, the normal travel area setting unit 13 specifies a plurality of routes (courses) B0 through which the host vehicle C is expected to pass when the steering angle or the lateral acceleration of the host vehicle C is changed by increments in an area from the route B1 to the route B2.

The normal travel area setting unit 13 sets a substantially fan-shaped area which is specified by the plurality of routes (particularly, routes B1 and B2), as a normal travel area AR. That is, the normal travel area setting unit 13 sets a travel range of the host vehicle C which is specified by a plurality of travel routes along which the host vehicle C is capable of traveling when the current lateral acceleration $Gy$ of the host vehicle C is increased or decreased by the normal amount of variation $\Delta Gy$, as the normal travel area AR.

Meanwhile, the normal travel area setting unit 13 changes the routes B1 and B2 by changing the normal amount of variation $\Delta Gy$ on the basis of information indicating detection results of the obstacle detection unit 11, information indicating identification results of the obstacle identification unit 12, or the like, and thereby sets (changes) the degree of width of the normal travel area AR, but the specific operation thereof will be described later.

Figure 4:
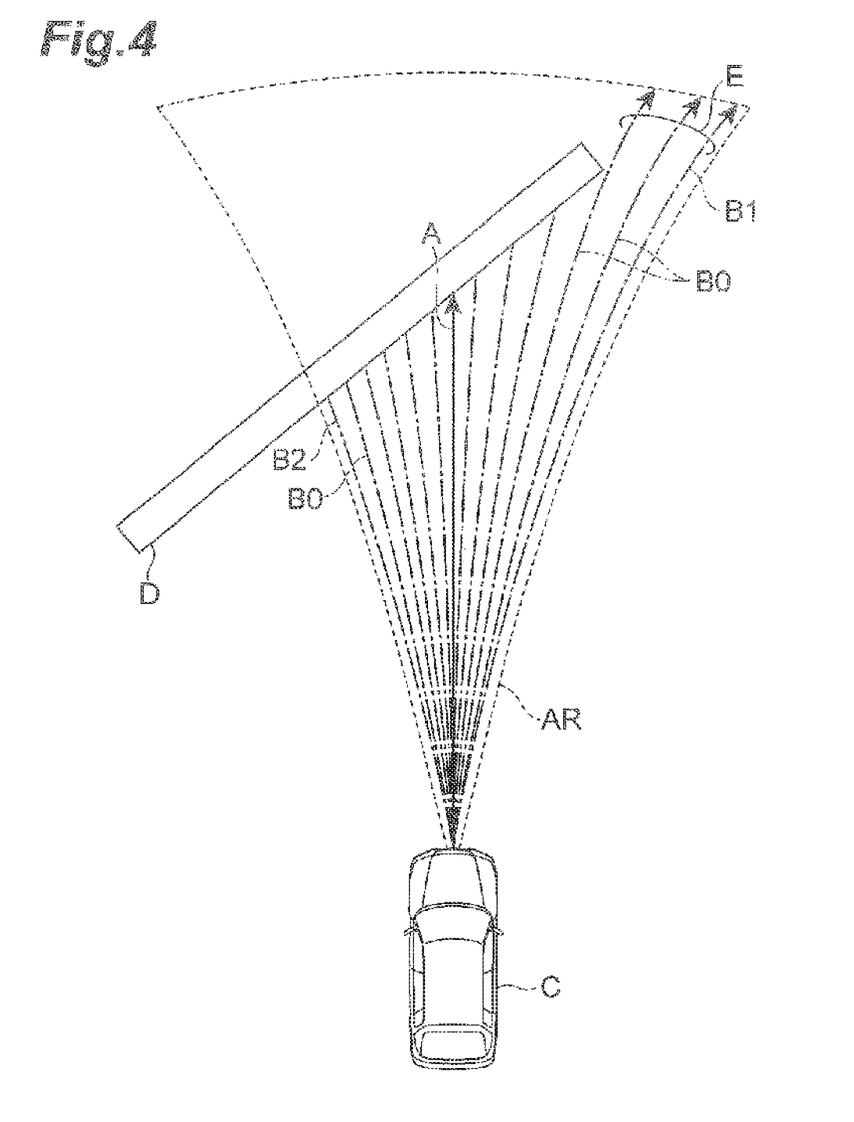
FIG. 4 is a diagram illustrating a situation in which a collision possibility determination unit shown in FIG. 1 determines collision possibility.

The collision possibility determination unit 15 determines whether there is the possibility of a collision between the obstacle and the host vehicle C within the normal travel area AR which is set by the normal travel area setting unit 13. That is, the collision possibility determination unit 15 determines whether an obstacle having the possibility of collision with the host vehicle C is present within the normal travel area AR which is set by the normal travel area setting unit 13. More specifically, as shown in FIG. 4, when an avoidance line B which is a travel route of the host vehicle C for which there is capability of avoiding a collision between the host vehicle C and an obstacle D is present within the normal travel area AR which is set by the normal travel area setting unit 13, the collision possibility determination unit 15 determines that a collision between the host vehicle C and the obstacle D can be avoided (that is, determines that the unavoidable obstacle D is not present within the normal travel area AR).

Figure 5:
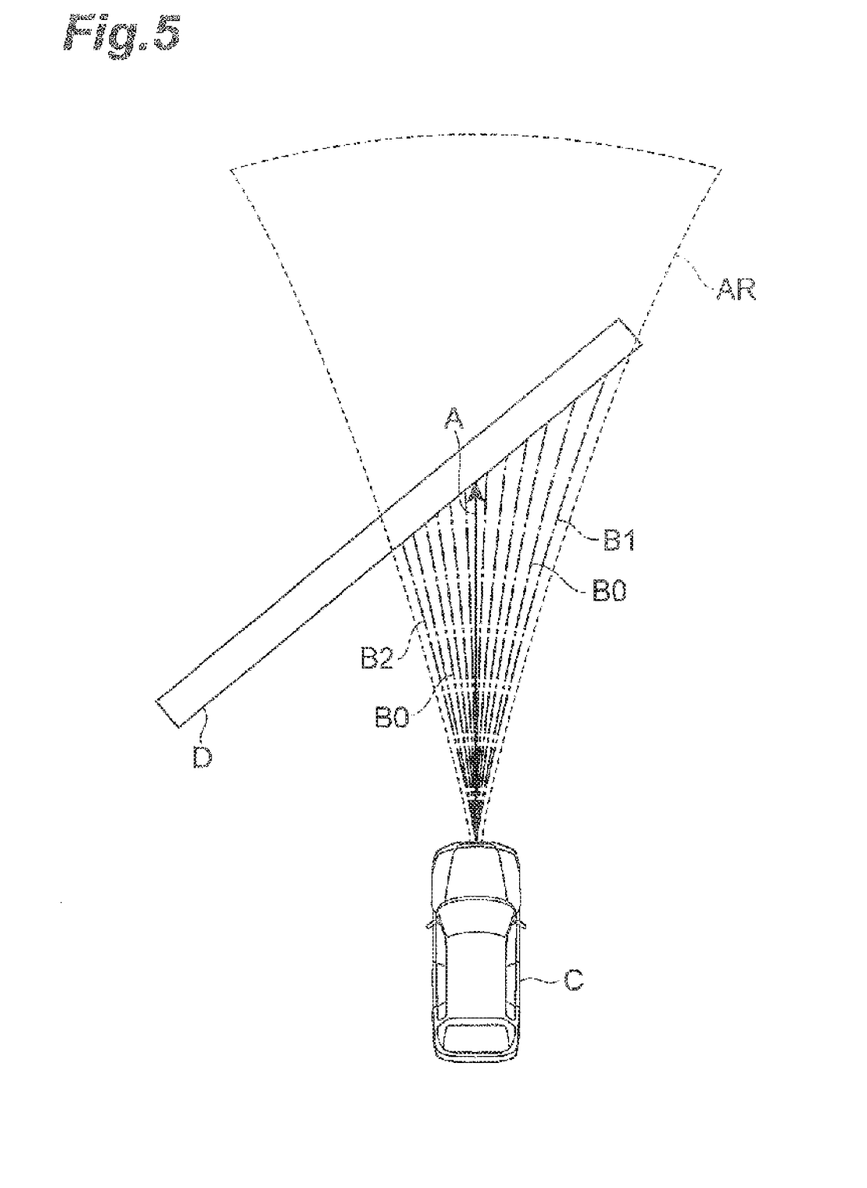
FIG. 5 is a diagram illustrating a situation in which the collision possibility determination unit shown in FIG. 1 determines collision possibility.

On the other hand, as shown in FIG. 5, for example, due to a relative positional relationship between the host vehicle C and the obstacle D changing, when an avoidance line is not present within the normal travel area AR (that is, when the obstacle D interferes with all the routes which are specified by the normal travel area setting unit 13), the collision possibility determination unit 15 determines that a collision between the host vehicle C and the obstacle D cannot be avoided within the normal travel area AR (that is, determines that the unavoidable obstacle D is present).

When it is determined by the collision possibility determination unit 15 that a collision between the host vehicle C and the obstacle D cannot be avoided (that is, when the unavoidable obstacle D is determined to be present), the collision avoidance assistance implementation unit 16 implements driving assistance for collision avoidance of the host vehicle C. In the collision avoidance assistance implementation unit 16, it is possible to determine a timing at which driving assistance for collision avoidance is implemented, for example, as follows. That is, the collision avoidance assistance implementation unit 16 can implement the driving assistance for collision avoidance when the length of a route having a longest distance between the host vehicle C and the obstacle D among the travel routes (for example, route B1 or B0, and the like) included in the normal travel area AR is set to be equal to or less than a predetermined threshold.

Alternatively, the collision avoidance assistance implementation unit 16 may calculate a time which will be taken until the host vehicle C arrives at the obstacle D with respect to the route having a longest distance between the host vehicle C and the obstacle D among the routes included in the normal travel area AR, and may perform driving assistance for collision avoidance when the time taken until arrival is set to be equal to or less than a predetermined threshold. The predetermined threshold relevant to the length of the route or the time taken until arrival can be changed in accordance with the state of the host vehicle C. More specifically, for example, when the vehicle speed of the host vehicle C is high, the predetermined threshold can be set to be higher than when the vehicle speed thereof is low. In addition, for example, when the yaw rate of the host vehicle C is high, the predetermined threshold may be set to be higher than when the vehicle speed thereof is low.

The driving assistance for collision avoidance which is implemented by the collision avoidance assistance implementation unit 16 can be assumed to provide control of the behavior of the host vehicle C such as, for example, control of electric power steering through the steering ECU 31 or control of an electronically controlled brake through the brake ECU 32. In this case, the collision avoidance assistance implementation unit 16 can calculate, for example, a target yaw rate required for avoiding a collision between the host vehicle C and the obstacle D, and can determine the control amount (steering torque) of electric power steering through the steering ECU 31 and the control amount (brake hydraulic pressure) of an electronically controlled brake through the brake ECU 32 so that the actual yaw rate of the host vehicle C is coincident with a target yaw rate.

A relationship between the target yaw rate and the steering torque and a relationship between the target yaw rate and the brake hydraulic pressure may be held in a state of being mapped in advance. In addition, a method of slowing down the host vehicle C is not limited to a method of actuating a friction brake through the control of an electronically controlled brake, and may be implemented using a method of converting (regenerating) kinetic energy of the host vehicle C into electrical energy or a method of increasing an engine brake by changing the transmission gear ratio of a transmission. In addition, a method of changing the yaw rate of the host vehicle C is not limited to a method of changing a steering angle through electric power steering, and may be implemented using a method of applying brake hydraulic pressures different from each other to the right and left wheels of the host vehicle C.

Further, the driving assistance for collision avoidance which is implemented by the collision avoidance assistance implementation unit 16 may be to provide the giving of a warning to a driver of the host vehicle C such as, for example, the sounding of a buzzer through the buzzer ECU 33 or the displaying of a message on a display unit through the meter ECU 34.

In this manner, this driving-assistance device 100 makes it a condition for implementing collision avoidance that the normal travel area AR including the course of the host vehicle C is set in the vicinity of the host vehicle C, and that a collision between the host vehicle C and the obstacle D cannot be avoided within the normal travel area AR. That is, the driving-assistance device 100 implements driving assistance for avoiding a collision between the host vehicle C and the obstacle D, on a condition that the unavoidable obstacle D is present in the normal travel area AR. Therefore, according to the driving-assistance device 100, it is possible to prevent a driver of the host vehicle C from feeling troubled, and to implement the driving assistance for collision avoidance appropriate to the driving sense of a driver.

Here, the normal travel area setting unit 13 sets the normal travel area AR at the degree of width depending on the obstacle D, on the basis of identification results of the obstacle D from the obstacle identification unit 12. More specifically, when a sense of danger (degree of collision risk) felt by a driver with respect to the obstacle D is relatively large, as shown in (a) of FIG. 6, the normal travel area setting unit 13 relatively reduces the degree of width W of the normal travel area AR in the vehicle-width direction of the host vehicle C, and advances a timing at which a condition for implementing collision avoidance assistance is established.

Figure 6:
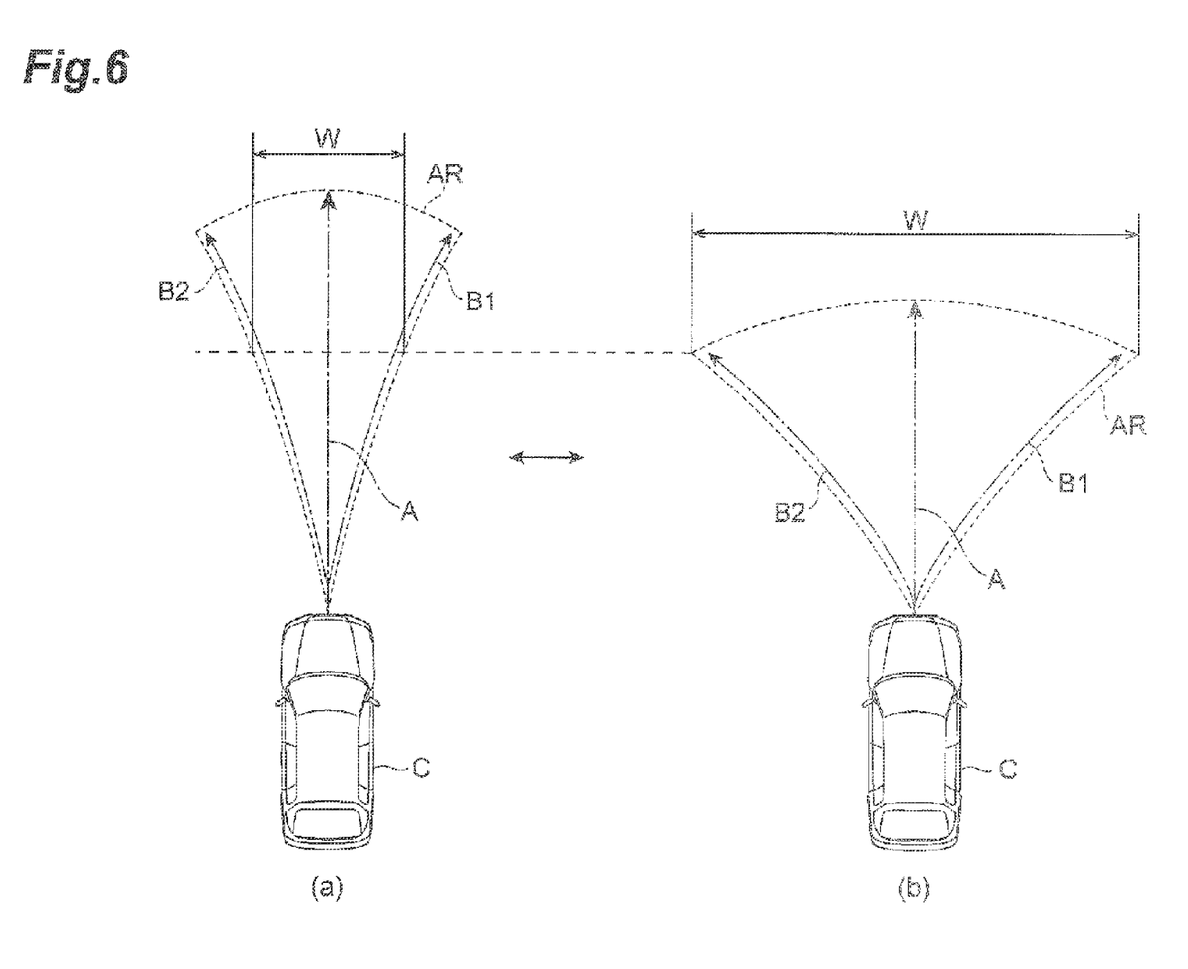
FIG. 6 is a diagram illustrating a situation in which the normal travel area setting unit shown in FIG. 1 sets the degree of width of the normal travel area.

On the other hand, when a sense of danger felt by a driver with respect to the obstacle D is relatively small, as shown in (b) of FIG. 6, the normal travel area setting unit 13 relatively increases the degree of width W of the normal travel area AR, and retards a timing at which a condition for implementing collision avoidance assistance is established. In this manner, in the driving-assistance device 100, as the degree of risk of a collision between the host vehicle C and the obstacle D becomes larger, the normal travel area setting unit 13 sets the degree of width W of the normal travel area AR in the vehicle-width direction of the host vehicle C to become smaller.

Therefore, since the timing at which the condition for implementing collision avoidance assistance is established is in response to the degree of risk (a sense of danger felt by a driver) of a collision between the host vehicle C and the obstacle D, it is possible to implement the driving assistance for collision avoidance still more appropriate to a driver's intuition. Meanwhile, the normal travel area setting unit 13 changes the degree of width W of the normal travel area AR by changing (adjusting) the normal amount of variation (amount of variation in momentum) ΔGy in accordance with the obstacle D.

A specific example of the setting (change) of the degree of width W of the normal travel area AR depending on the degree of collision risk may be, for example, as follows.

That is, the normal travel area setting unit 13 can make the degree of width W of the normal travel area AR smaller, for example, as the speed of approach between the host vehicle C and the obstacle D becomes higher. This is because a sense of danger felt by a driver increases as the speed of approach between the host vehicle C and the obstacle D becomes higher, and it is considered to be preferable to implement the driving assistance for collision avoidance at an earlier timing.

In addition, the normal travel area setting unit 13 can set the degree of width W of the normal travel area AR to become smaller as the absolute movement velocity of the obstacle D becomes higher. This is because a sense of danger felt by a driver increases as the absolute velocity of the obstacle D becomes higher, and it is considered to be preferable to implement assistance for collision avoidance at an earlier timing.

Figure 7:
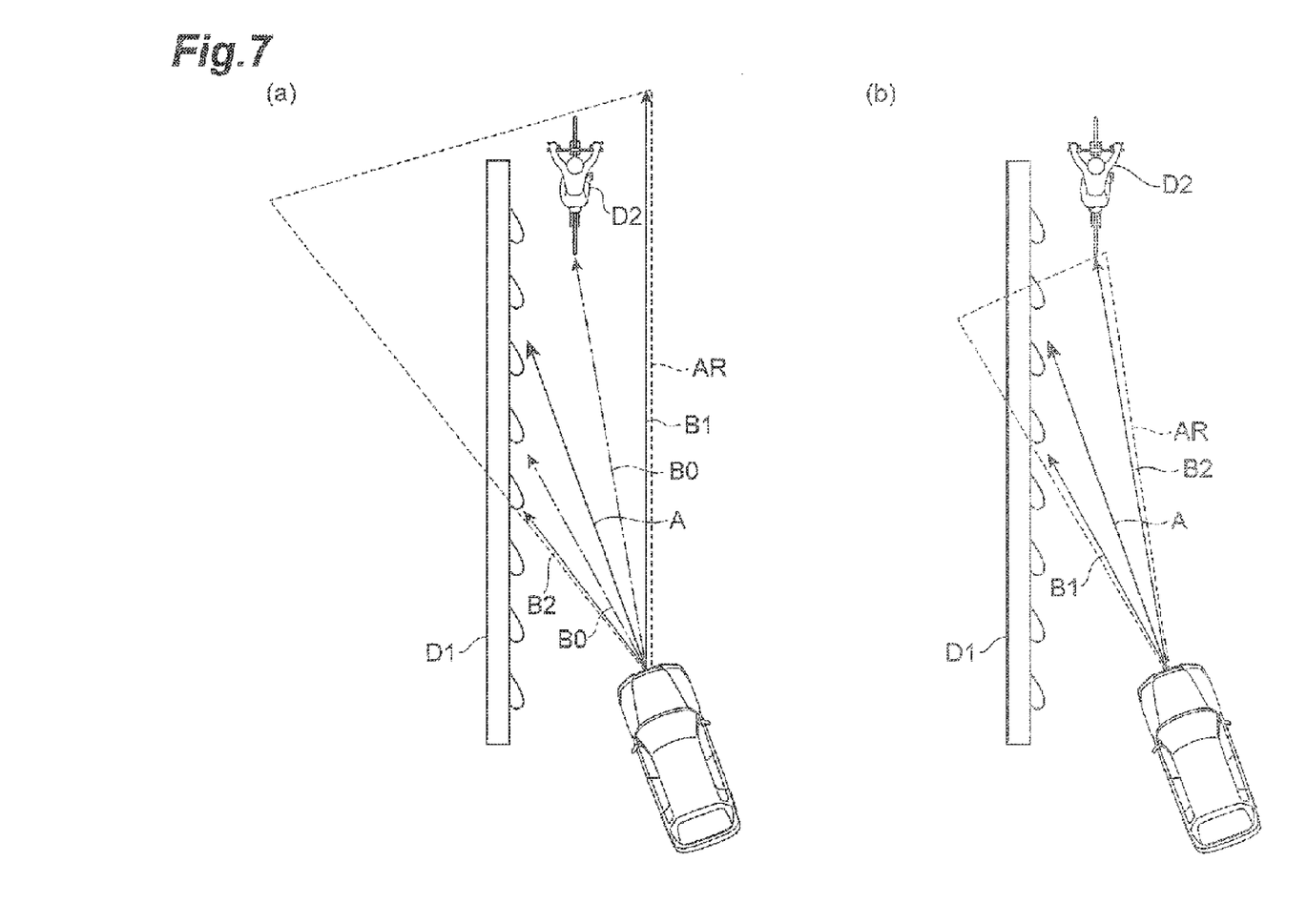
FIG. 7 is a diagram illustrating a situation in which the normal travel area setting unit shown in FIG. 1 changes the degree of width of the normal travel area.

On the other hand, as shown in (a) of FIG. 7, when the normal travel area setting unit 13 sets the normal travel area AR, a plurality of obstacles D1 and D2 may be detected within the normal travel area AR. According to the knowledge of the inventor, in such a case, for example, setting a timing, at which driving assistance for collision avoidance is implemented, on the basis of the normal travel area AR of the degree of width W depending on the obstacle (here, guardrail) D1 on the route A through which the host vehicle C is expected to pass when the host vehicle travels with the current momentum (lateral acceleration Gy) being maintained, the timing may be later than a timing at which a driver feels the need for collision avoidance with respect to the obstacle (here, bicycle) D2 which is considered to have a higher degree of collision risk.

Consequently, as shown in (b) of FIG. 7, when the plurality of obstacles D1 and D2 are detected within the normal travel area AR, the normal travel area setting unit 13 sets the degree of width W of the normal travel area AR in the vehicle-width direction of the host vehicle C to be smaller than when the single obstacle D is detected in the normal travel area AR. Here, the normal travel area setting unit 13 changes the degree of width W of the normal travel area AR to the degree of width W depending on the obstacle D2 which is considered to have a higher degree of collision risk. That is, when the plurality of obstacles D1 and D2 are detected within the normal travel area AR, the normal travel area setting unit 13 resets the normal travel area AR to become narrower.

Thereby, the timing at which driving assistance for collision avoidance is implemented according to the normal travel area AR which is temporarily set becomes appropriate to the timing at which a driver feels the need for collision avoidance with respect to an obstacle which is considered to have a higher degree of collision risk. In addition, in this case, the normal travel area setting unit 13 also changes the degree of width W of the normal travel area AR by changing (adjusting) the normal amount of variation (amount of variation in momentum) ΔGy in accordance with the obstacle.

A specific example of a change in the degree of width W of the normal travel area (resetting of the normal travel area AR) performed by the normal travel area setting unit 13 includes, for example, the following. That is, when a plurality of obstacles are detected within the normal travel area AR, the normal travel area setting unit 13 can set the degree of width to the degree of width W depending on an obstacle in which the degree of width W is set to be smallest among the plurality of obstacles.

In addition, when a plurality of obstacles including a stationary object (for example, guardrail mentioned above) and a moving object (for example, bicycle mentioned above) are detected within the normal travel area AR, the normal travel area setting unit 13 may set the degree of width W of the normal travel area AR to the degree of width W depending on the moving object in which the degree of width W is set to be smallest among the obstacles.

Figure 8:
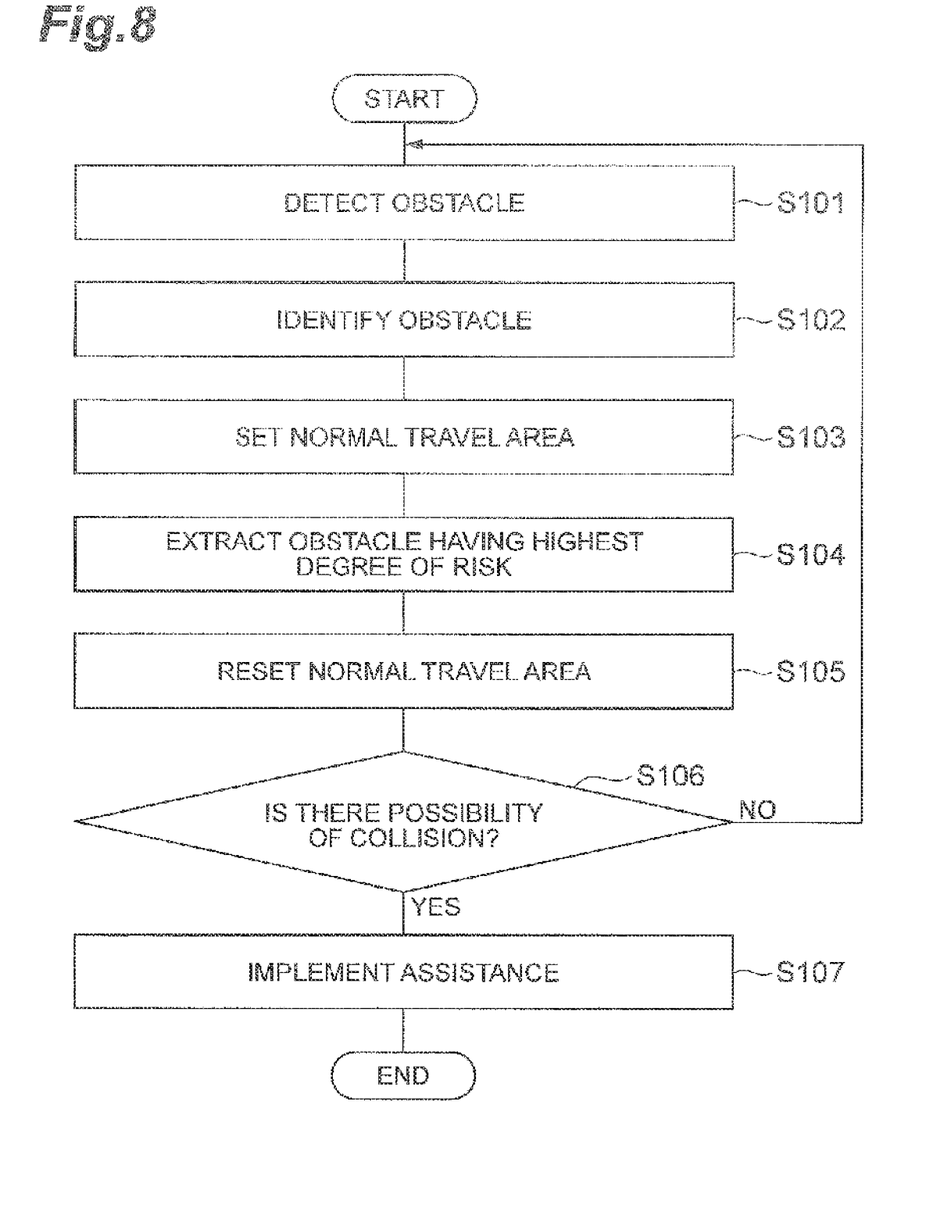
FIG. 8 is a flow diagram of a driving-assistance method which is implemented by the driving-assistance device shown in FIG. 1.

Subsequently, a driving-assistance method in the driving-assistance device 100 will be described with reference to FIG. 8. Meanwhile, a method described below relates to a case in which a plurality of obstacles are detected within the normal travel area AR. As shown in FIG. 8, in the driving-assistance device 100, initially, the obstacle detection unit 11 detects obstacles which are present in the vicinity of the host vehicle C on the basis of information from the external world recognition sensor 21 (step S101).

Subsequently, the obstacle identification unit 12 identifies the obstacles which are detected by the obstacle detection unit 11 (step S102). By the identification of the obstacle identification unit 12, it is identified whether the obstacles are, for example, stationary objects such as a telephone pole, a tree, a guardrail and the like, or moving objects such as a pedestrian, a two-wheeled vehicle such as a bicycle, a vehicle such as a preceding vehicle or an oncoming vehicle, and the like. In addition, the degree of collision risk of the obstacle is obtained.

Subsequently, the normal travel area setting unit 13 sets the normal travel area AR at the degree of width W depending on the obstacle identified by the obstacle identification unit 12, in the vicinity of the host vehicle C as described above (step S103: setting step). In this case, the normal travel area setting unit 13 sets the normal travel area AR at the degree of width W depending on the obstacle on the route A through which the host vehicle C is expected to pass when the host vehicle travels with the current momentum (lateral acceleration Gy) being maintained.

Subsequently, the normal travel area setting unit 13 (or the obstacle identification unit 12) extracts an obstacle having a highest degree of collision risk among a plurality of obstacles which are detected within the normal travel area AR (step S104: setting step). Here, for example, as described above, when the plurality of obstacles include a stationary object such as a guardrail or a moving object such as a bicycle, the moving object having a higher degree of collision risk is extracted.

Subsequently, the normal travel area setting unit 13 narrows the degree of width W of the normal travel area AR to the degree of width W depending on the obstacle which is extracted in step S104, and resets the normal travel area AR at the narrowed degree of width W (step S105: setting step). In this manner, in the collision avoidance assistance method, when a plurality of obstacles are detected within the normal travel area AR, the normal travel area setting unit 13 makes the degree of width W smaller than when a single obstacle is detected within the normal travel area AR.

Subsequently, the collision possibility determination unit 15 determines whether there is the possibility of a collision between the host vehicle C and the obstacle within the normal travel area AR which is reset as described above (step S106). In other words, the collision possibility determination unit 15 determines whether a collision between the host vehicle C and the obstacle can be avoided within the normal travel area AR (in other words, determines whether an unavoidable obstacle is present within the normal travel area AR). This can be determined depending on whether the avoidance line E is present within the normal travel area AR as described above.

As a result of the determination, when there is the possibility of a collision between the host vehicle C and the obstacle within the normal travel area AR (that is, when a collision between the host vehicle C and the obstacle cannot be avoided within the normal travel area AR (in other words, when an unavoidable obstacle is present within the normal travel area AR)), the collision avoidance assistance implementation unit 16 implements driving assistance for collision avoidance of the host vehicle C through various types of ECUs 31 to 34 (step S105.

Meanwhile, when the result of the determination in step S104 is that there is no possibility of the host vehicle C and the obstacle colliding with each other within the normal travel area AR (that is when a collision between the host vehicle C and the obstacle D can be avoided within the normal travel area AR (in other words, when an unavoidable obstacle is not present within the normal travel area AR)), the process flow in the driving-assistance device 100 returns to step S101. The driving-assistance device 100 repeatedly implements the above driving-assistance method at predetermined time intervals.

As described above, in the driving-assistance device 100 and the driving-assistance method according to the present embodiment, the degree of width W of the normal travel area AR becomes relatively smaller when a plurality of obstacles are detected within the normal travel area AR. For this reason, when the plurality of obstacles are present, a timing at which a collision between the host vehicle C and the obstacle cannot be avoided within the normal travel area AR (that is, a timing at which a condition for implementing collision avoidance assistance is established) becomes relatively earlier. Thus, according to the driving-assistance device 100 and the driving-assistance method, even in a situation where a plurality of obstacles are present within the normal travel area AR, it is possible to implement the driving assistance for collision avoidance more appropriate to a driver's intuition without causing a sense of discomfort to a driver.

The above embodiment is a description of an embodiment of the driving-assistance device and the driving-assistance method according to the present invention. Therefore, the driving-assistance device and the driving-assistance method according to the present invention are not limited to the above description. The driving-assistance device and the driving-assistance method as described according to the present invention can be arbitrarily changed and modified without departing from the scope of the appended claims.

For example, in the aforementioned embodiment, the driving-assistance device 100 and the driving-assistance method have been described with respect to a case where a plurality of obstacles include the obstacle D1 which is a guardrail and the obstacle D2 which is a bicycle, but obstacles to which the driving-assistance device 100 and the collision avoidance assistance method are applied are not limited thereto.

Figure 9:
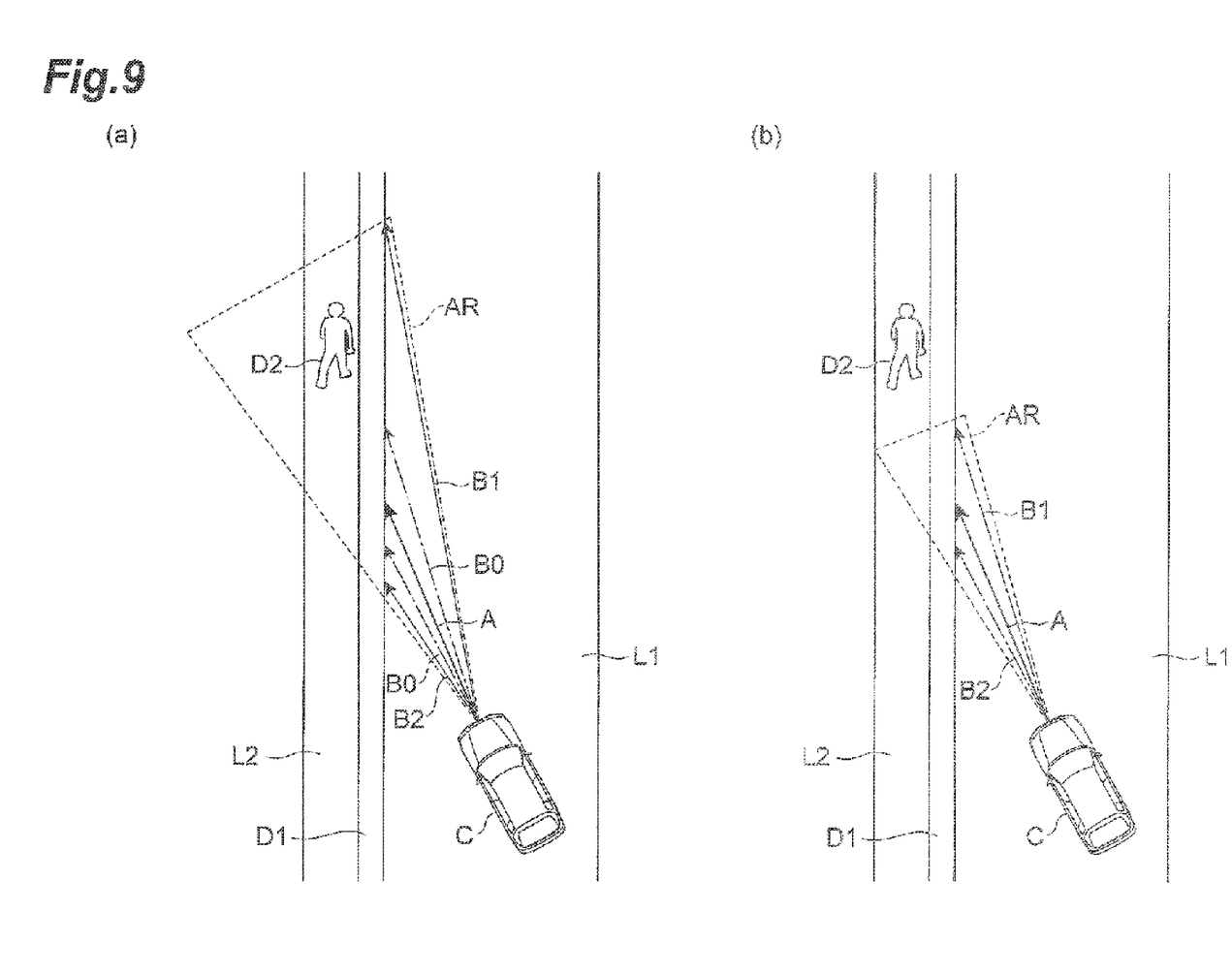
FIG. 9 is a diagram illustrating a modification example of the operation of the normal travel area setting unit shown in FIG. 1.

That is, as shown in FIG. 9, the driving-assistance device 100 and the collision avoidance assistance method can also be applied to a case where the plurality of obstacles include the obstacle D1 which is a demarcation line (white line) between a roadway L1 and a sidewalk L2 and the obstacle D2 which is a pedestrian. In this case, the normal travel area setting unit 13 temporarily sets the normal travel area AR at the degree of width W depending on the obstacle (demarcation line) D1 as shown in (a) of FIG. 9, and resets the normal travel area AR at the degree of width W depending on the obstacle D2 having a higher degree of collision risk, as shown in (b) of FIG. 9, when the obstacle (pedestrian) D2 is detected (extracted) within the normal travel area AR.

In this manner, the driving-assistance device 100 and the collision avoidance assistance method can be applied to a case where a plurality of obstacles including any obstacles within the normal travel area AR are detected. Further, the number of obstacles is not limited to two, and can be set to any number. In that case, for example, an obstacle having a highest degree of collision risk may extracted from any number of obstacles, and the normal travel area may be reset at the degree of width W depending on this obstacle.

Figure 10:
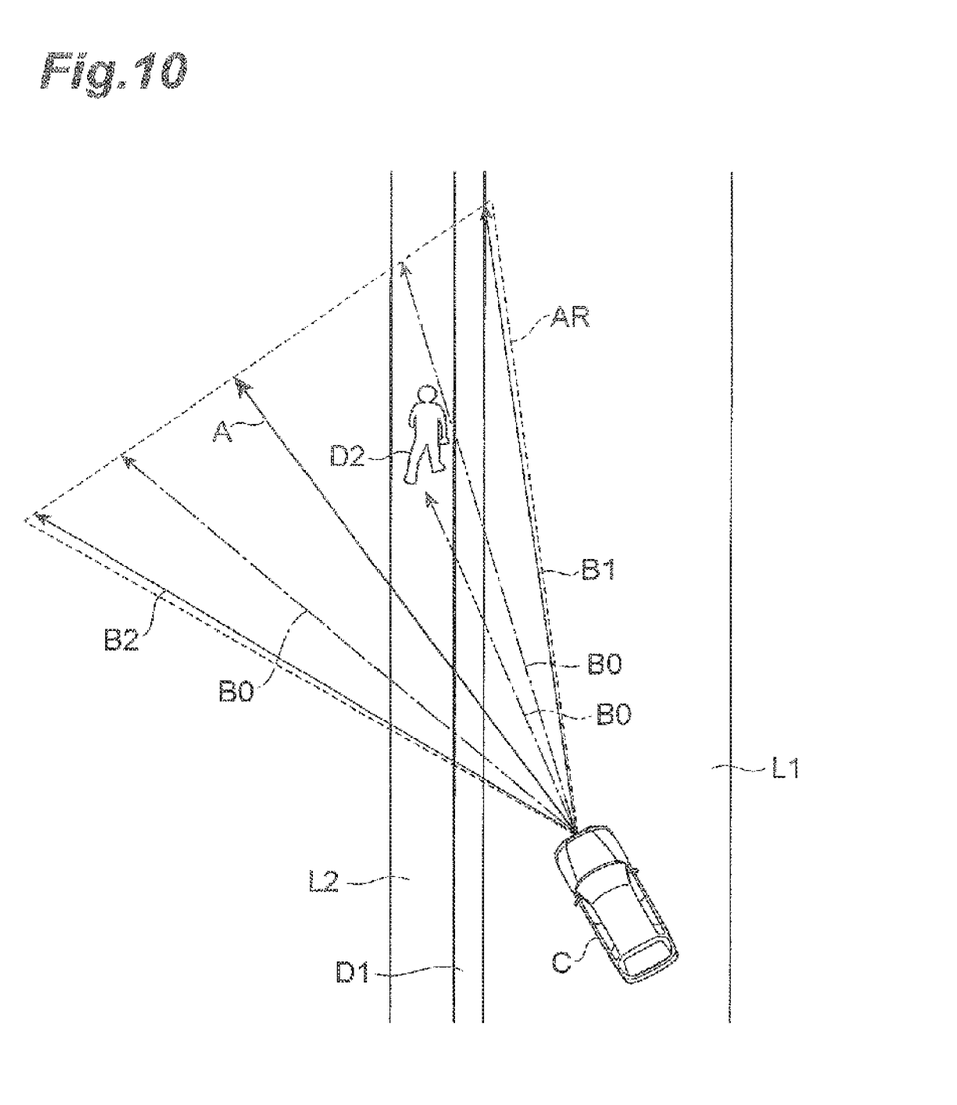
FIG. 10 is a diagram illustrating a modification example of the operation of the normal travel area setting unit shown in FIG. 1.

Meanwhile, as shown in FIG. 10, when the obstacle D1 is not regarded as an obstacle which is originally a demarcation line (that is, the obstacle D1 is set so as not to collide therewith), the normal travel area AR is set at the higher degree of width W, and the obstacle D2 which is a pedestrian is detected within the normal travel area AR, the degree of width W of the normal travel area AR may be set so as to reset the normal travel area AR at the degree of width W depending on the obstacle D2. In this case, since the normal travel area AR which is temporarily set becomes wider, the obstacle D2 such as a pedestrian has a tendency to be found.

In addition, the normal travel area (predetermined range) AR can be set from, for example, a range which can be detected by the external world recognition sensor 21 in the vicinity of the host vehicle, but is not limited to a case where the entire area is included in a range which can be detected by the external world recognition sensor 21, and may be smaller than the range which can be detected by the external world recognition sensor 21. For example, the normal travel area AR may be the same as the range which can be detected by the external world recognition sensor 21.

Further, the obstacle detection unit 11 is not limited to a configuration in which detection based on point measurement in the lines (for example, routes A, B0, B1, and B2) is performed. For example, the obstacle detection unit 11 may perform control on the basis of a range in which obstacles continuously extend in a vehicle-width direction, within a range which is set in a captured image of the external world recognition sensor 21.

INDUSTRIAL APPLICABILITY

According to the invention, it is possible to provide a driving-assistance device and a driving-assistance method which are capable of implementing driving assistance for collision avoidance more appropriate to a driver's intuition.

REFERENCE SIGNS LIST

13: normal travel area setting unit (setting means), 15: collision possibility determination unit (determination means), 16: collision avoidance assistance implementation unit (assistance means), 100: driving-assistance device, C: host vehicle, AR: normal travel area (predetermined range), D, D1 and D2: obstacle (three-dimensional object), W: degree of width, E: avoidance line

The invention claimed is:

1. A driving-assistance device in which, when a three-dimensional object is present on a course of a host vehicle, driving assistance for avoiding a collision between the host vehicle and the three-dimensional object is implemented on a condition that an unavoidable three-dimensional object is present in a predetermined range including the course, the driving-assistance device comprising:

a setting unit configured to set the predetermined range in the vicinity of the host vehicle according to a degree of width depending on the three-dimensional object, wherein, when a plurality of the three-dimensional objects are detected within the predetermined range, the setting unit makes the degree of width smaller than when a single three-dimensional object is detected within the predetermined range.

2. The driving-assistance device according to claim 1, wherein, when the plurality of three-dimensional objects are detected within the predetermined range, the setting unit sets the degree of width of the predetermined range to the degree of width depending on the three-dimensional object in which the degree of width is set to be smallest among the plurality of three-dimensional objects.

3. The driving-assistance device according to claim 1 wherein when the plurality of three-dimensional objects including a stationary object and a moving object are detected within the predetermined range, the setting unit sets the degree of width of the setting range to the degree of width depending on the moving object in which the degree of width is set to be smallest among the plurality of three-dimensional objects.

4. The driving-assistance device according to claim 1, wherein the setting unit makes the degree of width smaller as a degree of risk of a collision between the host vehicle and the three-dimensional object becomes higher.

5. The driving-assistance device according to claim 1, wherein the setting unit makes the degree of width smaller as a speed of approach between the host vehicle and the three-dimensional object becomes higher.

6. The driving-assistance device according to claim 1, wherein the setting unit makes the degree of width smaller as an absolute movement velocity of the three-dimensional object becomes higher.

7. The driving-assistance device according to claim 1, wherein the setting unit sets a travel range of the host vehicle which is specified by a plurality of travel routes along which the host vehicle is capable of traveling when a current momentum of the host vehicle is increased or decreased by an amount of variation in momentum, as the predetermined range, and changes the degree of width by changing the amount of variation in momentum.

8. The driving-assistance device according to claim 7, further comprising a determination unit configured to determine that an unavoidable three-dimensional object is present in the travel range when an avoidance line which is a travel route of the host vehicle for which there is capability of avoiding a collision with the three-dimensional object is not present within the travel range.

9. The driving-assistance device according to claim 8, further comprising an assistance unit configured to implement the driving assistance when a length of a travel route having a longest distance among travel routes of the host vehicle included in the travel range is equal to or less than a predetermined threshold, in a case where the determination unit determines that the unavoidable three-dimensional object is present in the travel range.

10. A driving-assistance method in which, when a three-dimensional object is present on a course of a host vehicle, driving assistance for avoiding a collision between the host vehicle and the three-dimensional object is implemented on a condition that an unavoidable three-dimensional object is present in a predetermined range including the course, the driving-assistance method comprising:

a setting step of setting the predetermined range in the vicinity of the host vehicle according to a degree of width depending on the three-dimensional object, wherein in the setting step, when a plurality of the three-dimensional objects are detected within the predetermined range, the degree of width is made smaller than when a single three-dimensional object is detected within the predetermined range.

* * * * *